Figure 5:
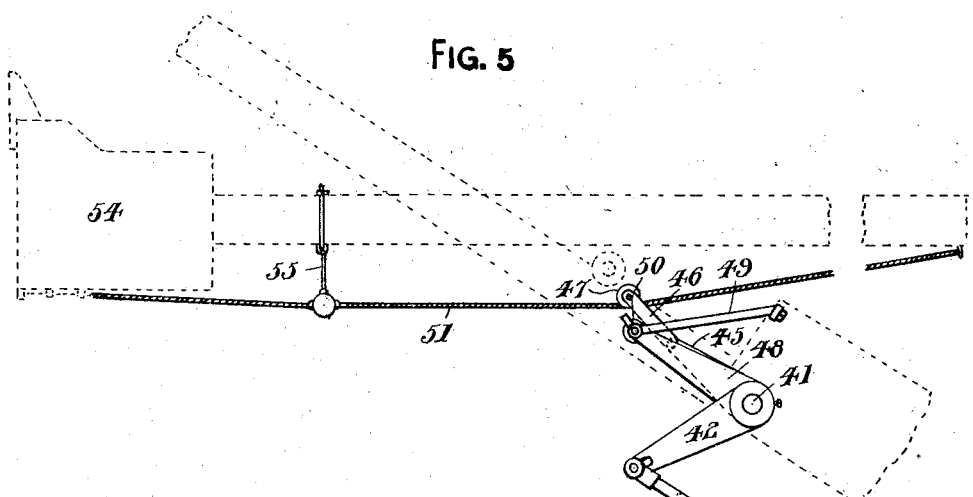

A. J. SCHARDING & P. J. DOYLE.
GATE OPENING DEVICE FOR EXCAVATORS.
APPLICATION FILED APR. 24, 1912.
1,062,038.
Patented May 20, 1913.
2 SHEETS—SHEET 1.
FIG. 1
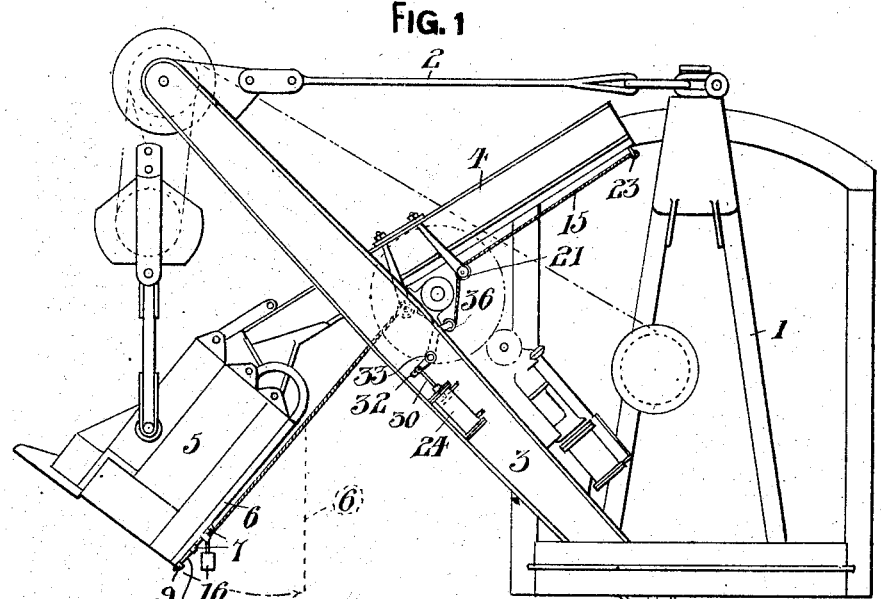
FIG. 4
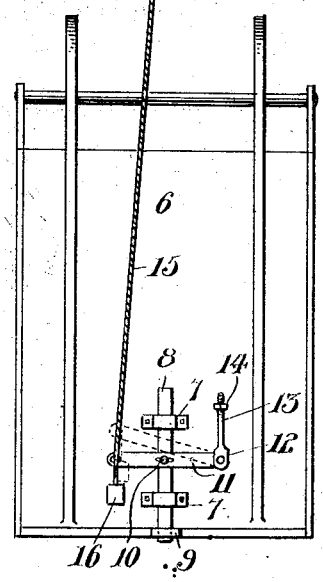
FIG. 2
FIG. 3
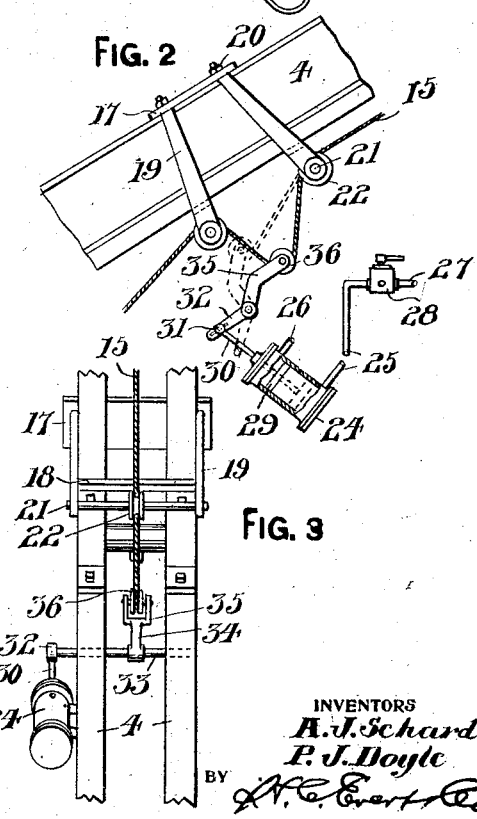
WITNESSES
INVENTORS
A. J. Scharding
P. J. Doyle
BY
ATTORNEYS A. J. SCHARDING & P. J. DOYLE.
GATE OPENING DEVICE FOR EXCAVATING.
APPLICATION FILED APR. 24, 1912.

1,062,038.

Patented May 20, 1913.

2 SHEETS—SHEET 2.

UNITED STATES PATENT OFFICE.

ALBERT JOHN SCHARDING AND PATRICK JAMES DOYLE, OF PITTSBURGH, PENNSYLVANIA.

GATE-OPENING DEVICE FOR EXCAVATORS.

1,062,038.  Specification of Letters Patent.  Patented May 20, 1913.

Application filed April 24, 1912. Serial No. 692,836.

*To all whom it may concern:*

Be it known that we, ALBERT JOHN SCHARDING and PATRICK JAMES DOYLE, citizens of the United States of America, residing at Pittsburgh, in the county of Allegheny and State of Pennsylvania, have invented certain new and useful Improvements in Gate-Opening Devices for Excavators, of which the following is a specification, reference being had therein to the accompanying drawing.

This invention relates to a gate opening device especially designed for the gates of excavator shovels or scoops, and our invention aims to provide steam, air or fluid pressure means for releasing the gates of an excavator shovel.

Our invention further aims to provide a gate releasing mechanism that does not interfere with the movement of the shovel or scoop in connection with which it is used, the device being arranged whereby it can be easily controlled by the main operator of the excavator.

Our invention still further aims to accomplish the above results by a mechanical construction that is durable, inexpensive to manufacture, easy to install in connection with various types of excavators and dredges, and highly efficient for the purposes for which it is employed.

With this understanding of the principal objects of our invention, reference will now be had to the drawing, wherein like numerals denote corresponding parts throughout the several views, in which:—

Figure 6:
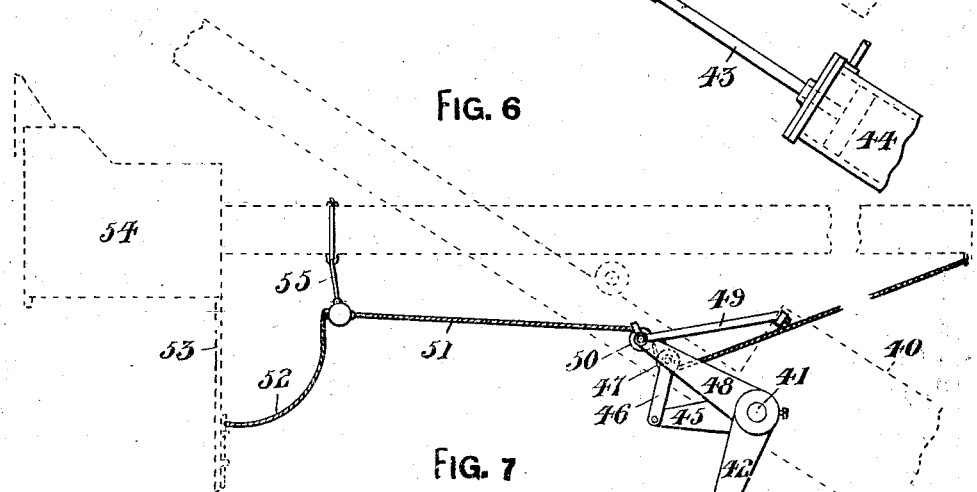
Figure 7:
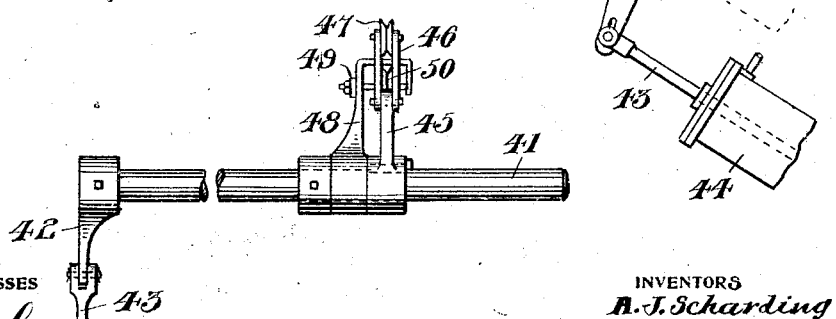

Figure 1 is a side elevation of a portion of an excavator, illustrating our device in connection therewith, Fig. 2 is an enlarged side elevation of a portion of the excavator arm or walking beam provided with the device, Fig. 3 is a bottom plan of the same, Fig. 4 is an elevation of a bucket or shovel gate in accordance with this invention, Fig. 5 is a side elevation of a modified form of device showing the shovel gate in a closed position, Fig. 6 is a similar view of the device showing the shovel gate in an open position, and Fig. 7 is a front elevation of a portion of the device.

In order that the application of our invention to an excavator can be readily understood, we have illustrated a mast 1, a crane 2, a jib or boom 3, arms or walking beams 4, and a shovel, bucket or scoop 5. These parts of the excavator are of the ordinary and well known type, and the shovel or scoop 5 has a hinged gate 6 that is opened whereby the contents of the shovel or scoop can be dumped or deposited at a desired point. The outer side of the gate 6, adjacent to the free edge thereof, has straps 7 and movably mounted in said strap is a latch 8 adapted to engage in a keeper 9 carried by the lower edge of the shovel or scoop 5. Loosely connected to the latch 8 by a pin 10 is a cross head 11 having one end thereof pivotally connected by a pin 12 to an eye bolt 13 adjustably mounted in a lug 14, carried by the gate 6. The eye bolt 13 can be adjusted, whereby the cross head 11 can be properly positioned for shifting the latch 8 to release the gate 6. Attached to the opposite end of the cross head 11 is a cable or rope 15 and a weight 16. The weight 16, through the medium of the cross head 11, retains the latch 8 in engagement with the keeper 9 when there is slack in the cable 15, also when the arm or walking beam 4 is being shifted, as will hereinafter appear.

Arranged upon the arm or walking beam 4 is a hanger, comprising a top plate 17, bottom bars 18 and side arms 19, said arms having the upper ends thereof extending through the plate 17 and held in engagement therewith by nuts 20. The arms 19 are arranged in sets and connecting the lower ends of said arms are transverse rods 21 upon which are revolubly mounted sheaves or pulleys 22. The cable or rope 15 passes over the sheaves 22 and has the end thereof connected to an eye or staple 23, carried by the upper end of the beam 4.

Secured to one side of the boom 3 is a cylinder 24 having an air or steam inlet pipe 25, adjacent to one end thereof, and an exhaust pipe 26 adjacent to the opposite end. An air or steam supply pipe 27 is connected to the pipe 25, and the pipe 27 has a two-way valve which when adjusted in one direction admits steam or air to the cylinder 24 and when adjusted in the other direction cuts off the supply of steam or air and allows the steam or air within the upper end of the cylinder to exhaust. The two-way valve 28 is of the ordinary and well known type forming no part of this invention, and any suitable means can be used for controlling the admission and exhaust of air to and from the cylinder 24. Movably mounted within the cylinder 24 is a piston 29 having a piston rod 30 with the end thereof connected, as at 31 to the slotted end of a crank 32, carried by a rock shaft 33, journaled in the jib or boom 3. The rock shaft 33 is provided with a crank 34 and the end of said crank is bifurcated, as at 35 to accommodate a sheave or pulley 36 under which passes the cable or rope 15.

By full lines in Fig. 2, the cable or rope 15 has been moved to shift the cross head 11, move the latch 8 out of engagement with the keeper 9, and permit the gate 6 to swing to an open position. The gate 6 swings open by gravity and due to the pressure of the load within the shovel or scoop, and after the contents thereof have been removed, the gate can be manually closed.

From the foregoing it will be observed that we have devised a novel device for automatically shifting the latch of a shovel gate, whereby the gate can open by gravity, and by resorting to the use of the weight 16, the latch 8 is retained in engagement with the keeper 9, while the walking beam 4 is being shifted relatively to the jib or boom 3. In other words, the movement of the sheaves 22 and 36 upon the cable or rope 15 does not move the cable or rope sufficiently to withdraw the latch 8 from the keeper 9.

In Figs. 5 to 7 inclusive there is illustrated a modification of the invention, wherein the jib or boom 40 has a transverse rock shaft 41 having one end thereof provided with a crank 42 that is connected to the piston rod 43 of a cylinder 44 similar to the cylinder 24. Mounted upon the rock shaft 41 is a crank 45 and pivotally connected to the outer end of said crank are parallel links 46 supporting a sheave 47.

Loosely mounted upon the shaft 41 is an arm 48 that has the outer end thereof connected to a brace 49 secured to the jib or boom 40. The outer end of the arm 48 is hook-shaped and is provided with a revoluble sheave 50, the shape of said arm serving as a guard for a cable 51 that passes over the sheave 50 and under the sheave 47.

One end of the cable 51 is anchored and is secured to the walking beam 4 and the opposite end thereof is connected to a latch 52 carried by a door 53. The cable 51, adjacent to the shovel 54, is supported by a hanger 55.

As illustrated in Fig. 5, the gate of the shovel is closed and the cable 51 is taut. When air or steam is admitted to the cylinder 44, the shaft 41 is immediately rocked and the cable 51 is pulled upon to move the latch 52 and release the gate of the shovel.

It is thought that the operation and utility of the device will be apparent without further description, and while in the drawing there is illustrated a preferred embodiment of the invention, it is to be understood that the structural elements thereof are susceptible to such variations and modifications as fall within the scope of the appended claims.

What we claim is:—

1. In a gate releasing device for excavators, the combination of a walking beam provided with a shovel having a gate, a latch for closing said gate, of a boom, a flexible element for releasing said latch, said element having one end engaging with the latch and its other end fixed to said walking beam, a sheave suspended from said walking beam and over which said element travels, a rock shaft supported by said boom, a crank carried by said shaft and provided with a rotatable element engaging said flexible elements, and a fluid pressure operated device carried by the boom and connected to said rock shaft for operating it for pulling said flexible element to release the latch of the gate.

2. In a gate releasing device for excavators, the combination of a walking beam provided with a shovel having a gate, a latch for closing said gate, of a boom, a flexible element for releasing said latch, said element having one end engaging with the latch and its other end fixed to said walking beam, a sheave suspended from said walking beam and over which said element travels, a rock shaft supported by said boom, a crank carried by said shaft and provided with a rotatable element engaging said flexible element, a second crank carried by said rock shaft, and a fluid pressure operated device including a piston slidably connected to said second crank and adapted when operated to shift said rock shaft whereby said first crank will shift said flexible element to release the latch to open the gate.

3. In a gate releasing device for excavators, the combination with a walking beam provided with a shovel having a gate, a latch for closing said gate, of a boom, a flexible element for releasing said latch, said element having one end engaging with the latch and its other end fixed to said walking beam, a pair of sheaves suspended from said beam and over which said flexible element travels, a rock shaft supported by said boom and provided with a pair of cranks, one of said cranks carrying a rotatable element engaging said flexible element at a point between said sheaves, and a fluid pressure operated device connected by the other of said cranks and adapted when operated to shift the rock shaft thereby pulling said flexible element to release the latch to open the gate.

In testimony whereof we affix our signatures in the presence of two witnesses.

ALBERT JOHN SCHARDING.
PATRICK JAMES DOYLE.

Witnesses:
J. W. BRADY,
MAX H. SROLOVITZ.